US011298982B2

(12) United States Patent
Skurich et al.

(10) Patent No.: US 11,298,982 B2
(45) Date of Patent: Apr. 12, 2022

(54) TREAD FOR A PNEUMATIC TIRE

(71) Applicant: The Goodyear Tire & Rubber Company, Akron, OH (US)

(72) Inventors: Michael Stefan Skurich, North Canton, OH (US); Zachary William Juergens, Canton, OH (US); Michael Richard Crano, Wadsworth, OH (US); Jung Wan Cho, Hudson, OH (US); Kenneth William Smesko, Uniontown, OH (US); Hans-Peter Guevara Leocadio, North Ridgeville, OH (US); Richard Mark Wieland, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 323 days.

(21) Appl. No.: 16/573,009

(22) Filed: Sep. 17, 2019

(65) Prior Publication Data

US 2021/0061017 A1     Mar. 4, 2021

Related U.S. Application Data

(60) Provisional application No. 62/893,203, filed on Aug. 29, 2019.

(51) Int. Cl.
*B60C 11/11* (2006.01)
*B60C 11/12* (2006.01)
(Continued)

(52) U.S. Cl.
CPC ...... *B60C 11/0304* (2013.01); *B60C 11/0066* (2013.01); *B60C 11/1204* (2013.01);
(Continued)

(58) Field of Classification Search
CPC ............ B60C 11/0304; B60C 11/1272; B60C 11/0066; B60C 11/1236; B60C 2011/1245; B60C 2011/1231
See application file for complete search history.

(56) References Cited

U.S. PATENT DOCUMENTS 1,877,988 A     9/1932  Schrank
2,272,879 A  *  2/1942  Hargraves ............. B60C 11/042
                                                152/209.22
(Continued)

FOREIGN PATENT DOCUMENTS

EP           618091 A1  * 10/1994
JP       07-186633 A   *  7/1995
(Continued)

OTHER PUBLICATIONS

Machine translation for Japan 2005-153812 (Year: 2021).*
(Continued)

*Primary Examiner* — Steven D Maki
(74) *Attorney, Agent, or Firm* — Robert N. Lipcsik (57) ABSTRACT

A tread for a tire includes: a first tread zone extending circumferentially, continuously, and entirely around the tire, the first tread zone being formed of a first compound; a second tread zone extending circumferentially, continuously, and entirely around the tire, the second tread zone being formed of a second compound different from the first compound; and a boundary groove axially separating the first tread zone from the second tread zone, the first tread zone, the second tread zone, and the boundary groove entirely forming the tread, the boundary groove having an axial centerline disposed an axial distance from an equatorial plane of the tire. The first tread zone has a first circumferential groove and a sidewall portion defining an
(Continued)

intermediate circumferential rib of the first tread zone and a shoulder circumferential rib of the first tread zone.

9 Claims, 4 Drawing Sheets

(51) Int. Cl.
    *B60C 11/13*     (2006.01)
    *B60C 11/03*     (2006.01)
    *B60C 11/00*     (2006.01)

(52) U.S. Cl.
    CPC ...... *B60C 11/1236* (2013.01); *B60C 11/1272* (2013.01); *B60C 2011/0358* (2013.01); *B60C 2011/1213* (2013.01); *B60C 2011/1231* (2013.01); *B60C 2011/1245* (2013.01); *B60C 2011/1254* (2013.01); *B60C 2011/1277* (2013.01)

(56) References Cited

U.S. PATENT DOCUMENTS

| | | |
|---|---|---|
| 2,382,068 A | 8/1945 | Kovacs |
| 4,794,965 A | 1/1989 | Lagnier |
| 4,994,126 A | 2/1991 | Lagnier |
| 5,031,680 A | 7/1991 | Kajikawa et al. |
| 5,385,189 A | 1/1995 | Aoki et al. |
| 5,386,861 A | 2/1995 | Overhoff et al. |
| 5,535,798 A | 7/1996 | Nakamura |
| 6,408,910 B1 | 6/2002 | Lagnier et al. |
| 6,681,824 B2 | 1/2004 | Lopez |
| 7,543,617 B2 | 6/2009 | Matsumoto |
| D609,162 S | 2/2010 | Dixon et al. |
| 8,006,730 B2 | 8/2011 | Ohara |
| 8,042,584 B2 | 10/2011 | Takahashi |
| 8,047,244 B2 | 11/2011 | Yoshikawa et al. |
| 8,281,830 B2 | 10/2012 | Ebiko |
| 8,365,783 B2 | 2/2013 | Minoli et al. |
| 8,757,229 B2 | 6/2014 | Knispel |
| D786,777 S | 5/2017 | Brayer et al. |
| D788,021 S | 5/2017 | Brayer et al. |
| D829,395 S | 10/2018 | Leocadio et al. |
| 10,308,081 B2 | 6/2019 | Jacobs et al. |
| 2003/0102064 A1 | 6/2003 | Below |
| 2003/0111150 A1 | 6/2003 | Zimmer et al. |
| 2008/0271826 A1 | 11/2008 | Maxwell et al. |
| 2008/0271827 A1 | 11/2008 | Morrison et al. |
| 2010/0206446 A1 | 8/2010 | Oizumi |
| 2018/0297417 A1 | 10/2018 | Higashiura |

FOREIGN PATENT DOCUMENTS

| | | | |
|---|---|---|---|
| JP | 07-228106 A | * | 8/1995 |
| JP | 11-321237 A | * | 11/1999 |
| JP | 2005-153812 A | * | 6/2005 |

OTHER PUBLICATIONS

Machine translation for Japan 11-321237 (Year: 2021).*
Machine translation for Japan 07-228106 (Year: 2021).*
Translation for Japan 07-186633 (Year: 2021).*
Machine translation for Europe 618091 (Year: 2021).*

* cited by examiner

TREAD FOR A PNEUMATIC TIRE

FIELD OF THE INVENTION

The present invention relates to pneumatic tires and, more particularly, to a pneumatic tire which may be suitably embodied as an all-season tire capable of providing enhanced driving performance in snowy road conditions and steering stability in dry road conditions.

BACKGROUND OF THE INVENTION

A conventional pneumatic tire includes a first tread pattern formed between a tire equator and one of tread edges and a second tread pattern formed between the tire equator and the other one of the tread edges, the first tread pattern and the second pattern being formed as substantially line symmetrical shape with respect to the tire equator and being shifted with respect to one another in a tire circumferential direction. Each of the first and second tread patterns is provided with lateral inclined grooves, inner and outer connecting grooves, and central connecting grooves each extending across the tire equator to connect one of the lateral inclined grooves arranged on the first tread pattern with one of the lateral inclined grooves arranged on the second tread pattern.

Thus, the tread portion includes a row of central blocks which are divided by the lateral inclined grooves, the inner connecting grooves and the central connecting grooves, a row of middle blocks which are divided by the lateral inclined grooves, the inner connecting grooves and the outer connecting grooves and a row of shoulder blocks which are divided by the lateral inclined grooves and the outer connecting grooves and one of the tread edges. As to improve traction and braking properties upon operating on snowy road conditions, a configuration of sipes is disposed on the central blocks since the tread central region tends to have a larger circumferential grounding length. For example, by arranging the sipes on the central blocks such that the sipes extend along the tire axial direction (i.e., perpendicular to the tire equator), the sipes may scratch the snow road to increase traction effectively.

Definitions

As used herein and in the claims:

"Apex" means an elastomeric filler located radially above the bead core and between the plies and the turnup ply.

"Annular" means formed like a ring.

"Aspect ratio" means the ratio of a tire section height to its section width.

"Aspect ratio of a bead cross-section" means the ratio of a bead section height to its section width.

"Asymmetric tread" means a tread that has a tread pattern not symmetrical about the centerplane or equatorial plane (EP) of the tire.

"Axial" and "axially" refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane (EP) of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane (EP) of the tire. If multiple plies are present, the ply cords run at opposite angles in alternating layers.

"Breakers" means at least two annular layers or plies of parallel reinforcement cords having the same angle with reference to the equatorial plane (EP) of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls, and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" and "circumferentially" mean lines or directions extending along the perimeter of the surface of the annular tire parallel to the equatorial plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane (EP). The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Evolving tread pattern" means a tread pattern, the running surface of which, which is intended to be in contact with the road, evolves with the wear of the tread resulting from the travel of the tire against a road surface, the evolution being predetermined at the time of designing the tire, so as to obtain adhesion and road handling performances which remain substantially unchanged during the entire period of use/wear of the tire, no matter the degree of wear of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made, that forms the basic element of filaments; characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High tensile steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360° rotation about another filament or strand.

"Load range" means load and inflation limits for a given tire used in a specific type of service as defined by tables in The Tire and Rim Association, Inc.

"Mega tensile steel (MT)" means a carbon steel with a tensile strength of at least 4500 MPa at 0.20 mm filament diameter.

"Net contact area" means the total area of ground contacting elements between defined boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal load" means the specific design inflation pressure and load assigned by the appropriate standards organization for the service condition for the tire.

"Normal tensile steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65° and 90° with respect to the equatorial plane (EP) of the tire.

"Radial ply tire" means a belted or circumferentially-restricted pneumatic tire in which at least one ply has cords which extend from bead to bead and the ply is laid at cord angles between 65° and 90° with respect to the equatorial plane (EP) of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section height" means the radial distance from the nominal rim diameter to the outer diameter of the tire at its equatorial plane (EP).

"Section width" means the maximum linear distance parallel to the axis of the tire and between the exterior of its sidewalls when and after it has been inflated at normal pressure for 24 hours, but unloaded, excluding elevations of the sidewalls due to labeling, decoration, or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super tensile steel (ST)" means a carbon steel with a tensile strength of at least 3650 MPa at 0.20 mm filament diameter.

"Tenacity" is stress expressed as force per unit linear density of the unstrained specimen (gm/tex or gm/denier).

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra tensile steel (UT)" means a carbon steel with a tensile strength of at least 4000 MPa at 0.20 mm filament diameter.

"Vertical deflection" means the amount that a tire deflects under load.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

SUMMARY OF THE INVENTION

The present disclosure has been made in view of the above circumstances and has an object to provide a pneumatic or non-pneumatic tire demonstrating optimal performance in snow road conditions and steering stability in dry road conditions.

A tread for a tire, in accordance with the present invention, includes: a first tread zone extending circumferentially, continuously, and entirely around the tire, the first tread zone being formed of a first compound; a second tread zone extending circumferentially, continuously, and entirely around the tire, the second tread zone being formed of a second compound different from the first compound; and a boundary groove axially separating the first tread zone from the second tread zone, the first tread zone, the second tread zone, and the boundary groove entirely forming the tread, the boundary groove having an axial centerline disposed an axial distance from an equatorial plane of the tire. The first tread zone has a first circumferential groove and a sidewall portion defining an intermediate circumferential rib of the first tread zone and a shoulder circumferential rib of the first tread zone.

According to another aspect of the tread, the axial distance is between 10 mm and 30 mm.

According to still another aspect of the tread, the axial distance defines a first tread zone with an axial width less than an axial width of the second tread zone.

According to yet another aspect of the tread, the second tread zone has no circumferential grooves extending entirely around the tire.

According to still another aspect of the tread, the intermediate circumferential rib includes curved grooves extending laterally from the boundary circumferential groove across an entire axial width of the intermediate circumferential rib to the first circumferential groove.

According to yet another aspect of the tread, the intermediate circumferential rib includes curved blind sipes extending axially away from the boundary groove.

According to still another aspect of the tread, the shoulder circumferential rib includes curved blind sipes extending axially away from the first circumferential groove.

According to yet another aspect of the tread, the second tread zone includes first lateral inclined and curved grooves spaced in the tire circumferential direction from each other.

According to still another aspect of the tread, the second tread zone includes second lateral inclined and curved grooves intersecting the first lateral inclined and curved grooves.

According to yet another aspect of the tread, the second tread zone includes first lateral inclined and curved sipes generally parallel to the first lateral inclined and curved grooves.

According to still another aspect of the tread, the second tread zone includes second lateral inclined and curved sipes generally parallel to the second lateral inclined and curved grooves.

According to yet another aspect of the tread, the second tread zone includes a circumferential sipe extending circumferentially around the entire second tread zone.

According to still another aspect of the tread, the circumferential sipe has an axial width between 1.0 mm and 2.0 mm.

According to yet another aspect of the tread, the circumferential sipe has a radial depth between 5 mm and 7 mm.

According to still another aspect of the tread, the second tread zone includes "micro-grooves" for increasing traction during acceleration/braking of the tire.

A method in accordance with the present invention designs a tread for a tire. The method includes the steps of: forming a first tread zone of a first compound; extending the first tread zone circumferentially, continuously, and entirely around the tire; forming a second tread zone of a second compound different from the first compound; extending the second tread zone circumferentially, continuously, and entirely around the tire; separating the first tread zone from the second tread zone by a boundary groove; entirely forming the tread from the first tread zone, the second tread zone, and the boundary groove; offsetting the boundary groove axially from an equatorial plane of the tire by a predetermined distance; angling first curved grooves laterally across the second tread zone; angling second curved grooves laterally across the second tread zone; intersecting of the first curved grooves by the second curved grooves; angling first curved sipes generally parallel to the first curved grooves; and angling second curved sipes generally parallel to the second curved grooves.

According to another aspect of the method, the second tread zone includes a circumferential sipe extending circumferentially around the entire second tread zone.

According to still another aspect of the method, the circumferential sipe has an axial width between 1.0 mm and 2.0 mm.

According to yet another aspect of the method, the circumferential sipe has a radial depth between 5 mm and 7 mm.

According to still another aspect of the method, the second tread zone includes "micro-grooves" for increasing traction during acceleration/braking of the tire.

DESCRIPTION OF EXAMPLES OF THE PRESENT INVENTION

Figure 1:
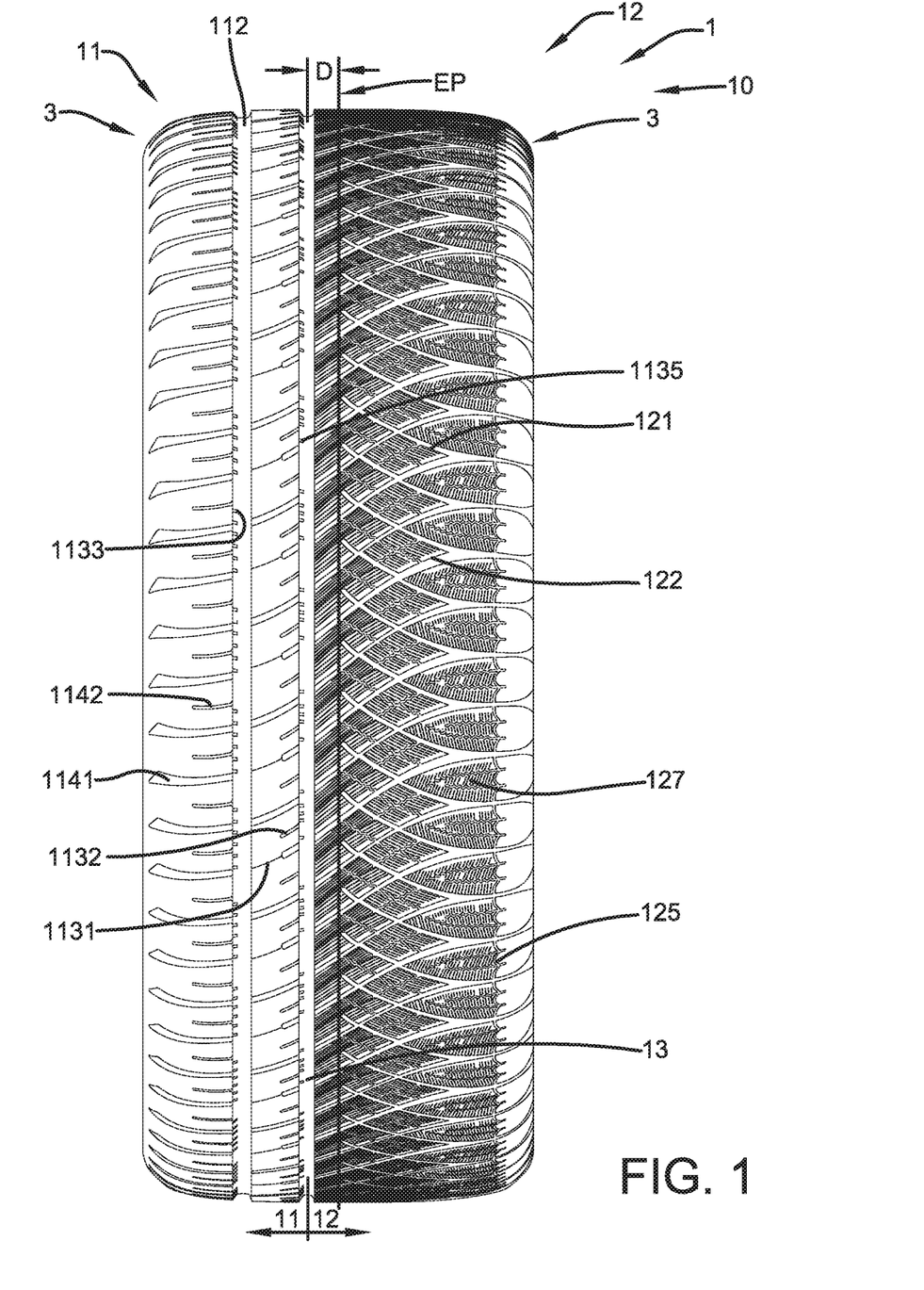
FIG. 1 is a schematic view of a tread pattern of a pneumatic tire according to the present invention.
Figure 2:
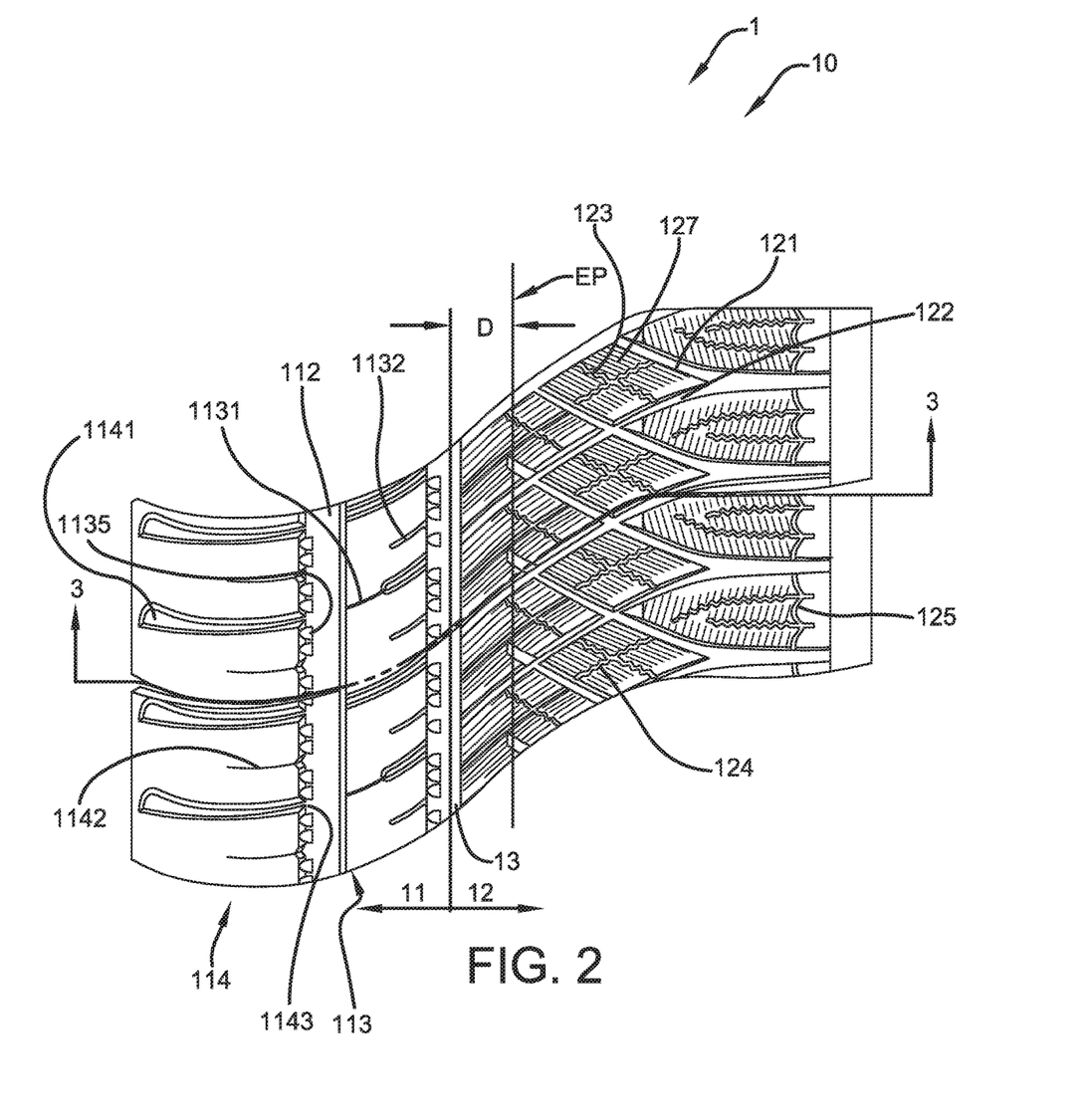
FIG. 2 is an enlarged schematic view of the tread pattern of FIG. 1.
Figure 3:
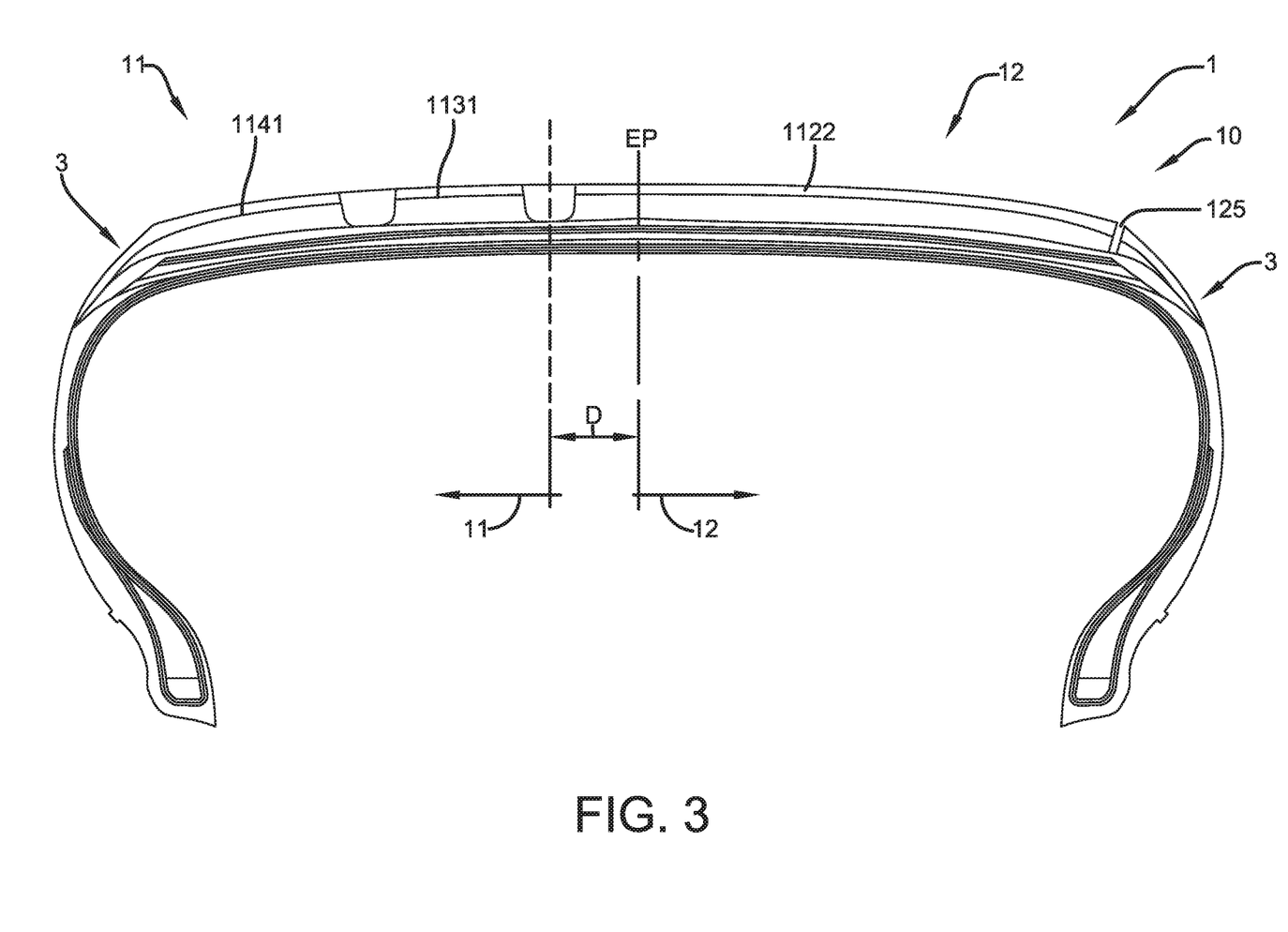
FIG. 3 is a schematic cross-sectional view along line 3-3 in FIG. 2.

As illustrated in FIGS. 1-3, an example tire 1 in accordance with the present invention may include a first tread zone 11 extending circumferentially, continuously, and entirely around the tire and a second tread zone 12 extending circumferentially, continuously, and entirely around the tire. In this example tire 1, the first tread zone 11 is axially adjacent the second tread zone 12 and the first and second tread zones together form a complete tread 10 for the tire. The first tread zone 11 may be formed of a first compound suitable for summer driving conditions. Such a first compound may resist deformation and provide optimal grip in dynamic handling conditions. The second tread zone 11 may be formed of a second different compound suitable for winter driving conditions. Such a second compound may enhance snow/ice/wet performance and evacuate water and slush effectively.

As seen in FIGS. 1-3, the first tread zone 11 may have an axial width less than one half the total axial width of the tread 10. The first tread zone 11 may have one circumferential groove 112. The second tread zone 12 may have no main circumferential grooves (FIGS. 1-2). The first tread zone 11 may be axially separated from the second tread zone 12 by one boundary circumferential groove 13.

The first tread zone 11 may include an intermediate circumferential rib 113 and a shoulder circumferential rib 114 defined by a sidewall 3 of the tire 1, the circumferential groove 112 of the first tread zone 11 and the boundary circumferential groove 13. An axial centerline of the boundary circumferential groove 13 may be disposed an axial distance D from the equatorial plane EP of the tire 1 giving the first tread zone 11 an axial width less than that of the second tread zone 12. The axial distance D may between 10.0 mm and 30.0 mm, or 20.0 mm.

The intermediate circumferential rib 113 may include curved grooves 1131 extending laterally from the boundary circumferential groove 13 across an entire axial width of the intermediate circumferential rib to the circumferential groove 112. The intermediate circumferential rib 113 may further include curved blind sipes 1132 extending axially away from the boundary circumferential groove 13.

The shoulder circumferential rib 114 may include curved grooves 1141 extending laterally from the circumferential groove 112 across an entire axial width of the shoulder circumferential rib to the sidewall 3. The shoulder circumferential rib 113 may further include curved blind sipes 1142 extending axially away from the circumferential groove 112.

The second tread zone 12 may include first lateral inclined and curved grooves 121 spaced in the tire circumferential direction from each other and second lateral inclined and curved grooves 122 intersecting the first lateral inclined grooves. As shown in FIG. 2, both the first lateral inclined and curved grooves 121 the second lateral inclined and curved grooves 122 may originate from the same lateral groove adjacent an opposite sidewall 3 of the tire 1. The second tread zone 12 may further include first lateral inclined and curved sipes 123 generally parallel to the first lateral inclined and curved grooves 121 and second lateral inclined and curved sipes 124 generally parallel to the second lateral inclined and curved grooves 122.

The second tread zone 12 may further include a circumferential sipe 125 extending circumferentially around the entire second tread zone. The sipe 125 may dissipate heat and thereby improve rolling resistance and fuel economy contributions from the second tread zone 12 to the overall tread 10. The circumferential sipe 125 may have an axial width between 1.0 mm and 2.0 mm, or 1.3 mm and a radial depth between 5 mm and 7 mm, or 6 mm. The second tread zone 12 may also include "micro-grooves" 127 for increasing traction during acceleration/braking.

Figure 4:
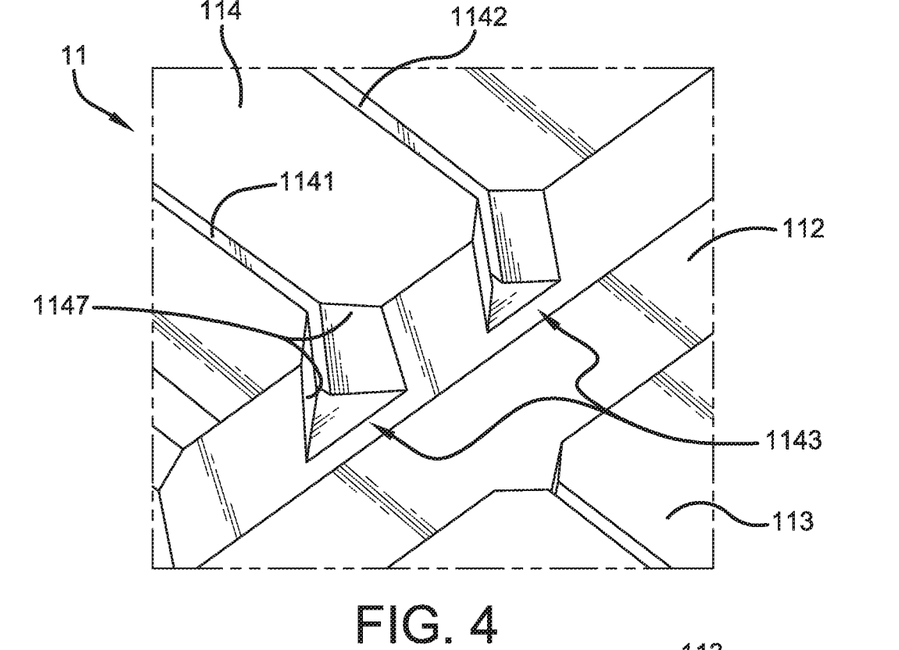
FIG. 4 is a detailed schematic perspective view of part of the tread pattern of FIGS. 1 and 2.
Figure 5:
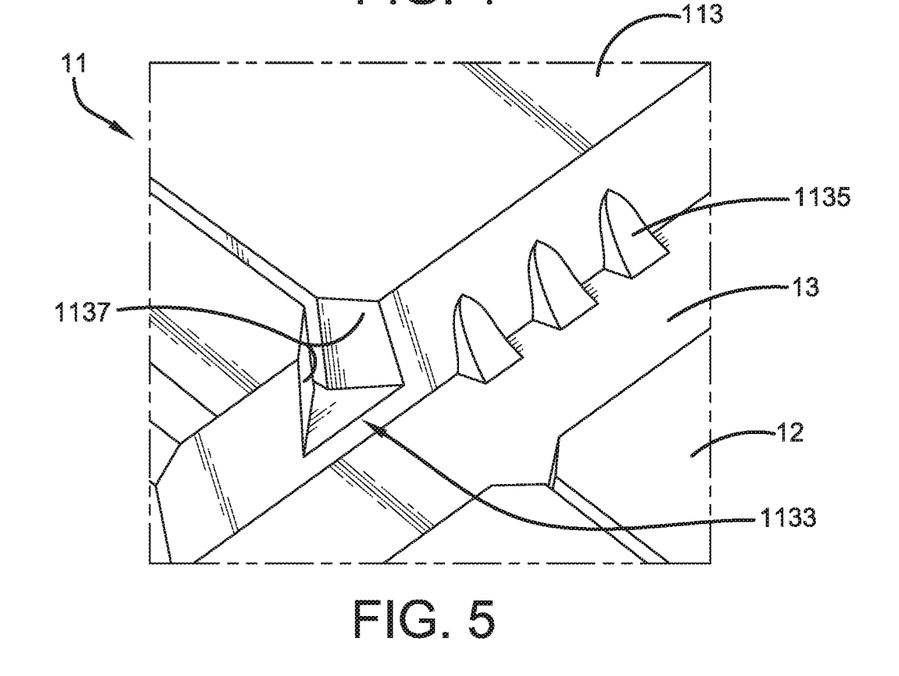
FIG. 5 is a detailed schematic perspective view of another part of the tread pattern of FIGS. 1 and 2.

As shown in FIGS. 4-5, the grooves 1131, 1141 and the sipes 1132 (not shown), 1142 of the first tread zone 11 may terminate at the grooves 13, 112 with notches 1133, 1143 that evolve during tread wear and form additional and evolving traction edges 1137, 1147 for improved traction in wet/snow conditions. The notches 1133, 1143 may widen as they project radially inward and axially inward (FIGS. 4-5). Use of the notches 1133, 1143 at termination points of the grooves 1131, 1132, 1141, 1142 as the grooves intersect with the main circumferential grooves 13, 112 may create additional voids in the tire 1 in which snow may be captured and maintained for additional generation of snow-on-snow shear force. The notches 1133, 1143 may not detract from circumferential groove volume, so there may be no negative effect on wet or hydroplaning performance (e.g., notches advantageously add additional wet void to the circumferential grooves) and may eliminate sharp block corners (90 degrees or less) for better worn/handling appearance (e.g., similar to block edge/corner chamfering (not shown)). Further, adjacent the notches 1133, 1143, L-shaped teeth 1135 may be placed at the base of the grooves 13, 112 to further reinforce the grooves and ribs 113, 114 for improved dry/wet handling. Such teeth 1135 may also enhance snow capture and thereby improve shear traction of the first tread zone 11. The L-shaped teeth 1135 may extend axially farther into the grooves 13, 112 as the teeth project radially inward (FIGS. 4-5).

The foregoing and other objects, features, and advantages of the present invention will be apparent from the above detailed descriptions of examples of the present invention, as illustrated in the accompanying drawings wherein like reference numbers represent like parts of the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A tread for a tire comprising:
   a first tread zone extending circumferentially, continuously, and entirely around the tire, the first tread zone being formed of a first compound;
   a second tread zone extending circumferentially, continuously, and entirely around the tire, the second tread zone being formed of a second compound different from the first compound; and a boundary groove axially separating the first tread zone from the second tread zone, the first tread zone, the second tread zone, and the boundary groove entirely forming the tread, the boundary groove having an axial centerline disposed an axial distance from an equatorial plane of the tire, the first tread zone having a first circumferential groove and a sidewall portion defining an intermediate circumferential rib of the first tread zone and a shoulder circumferential rib of the first tread zone, the intermediate circumferential rib including curved blind sipes extending axially away from the boundary groove, the shoulder circumferential rib including curved blind sipes extending axially away from the first circumferential groove, the second tread zone including first lateral inclined and curved grooves spaced in the tire circumferential direction from each other, the second tread zone including second lateral inclined and curved grooves intersecting the first lateral inclined and curved grooves, the second tread zone including first lateral inclined and curved sipes generally parallel to the first lateral inclined and curved grooves, the second tread zone including second lateral inclined and curved sipes generally parallel to the second lateral inclined and curved grooves.

2. The tread as set forth in claim 1 wherein the axial distance is between 10 mm and 30 mm.

3. The tread as set forth in claim 1 wherein the axial distance defines a first tread zone with an axial width less than an axial width of the second tread zone.

4. The tread as set forth in claim 1 wherein the second tread zone has no circumferential grooves extending entirely around the tire.

5. The tread as set forth in claim 1 wherein the intermediate circumferential rib includes curved grooves extending laterally from the boundary circumferential groove across an entire axial width of the intermediate circumferential rib to the first circumferential groove.

6. The tread as set forth in claim 1 wherein the second tread zone includes a circumferential sipe extending circumferentially around the entire second tread zone.

7. The tread as set forth in claim 6 wherein the circumferential sipe has an axial width between 1.0 mm and 2.0 mm.

8. The tread as set forth in claim 6 wherein the circumferential sipe has a radial depth between 5 mm and 7 mm.

9. The tread as set forth in claim 1 wherein the second tread zone includes micro-grooves for increasing traction during acceleration/braking of the tire.

* * * * *